Figure 1:
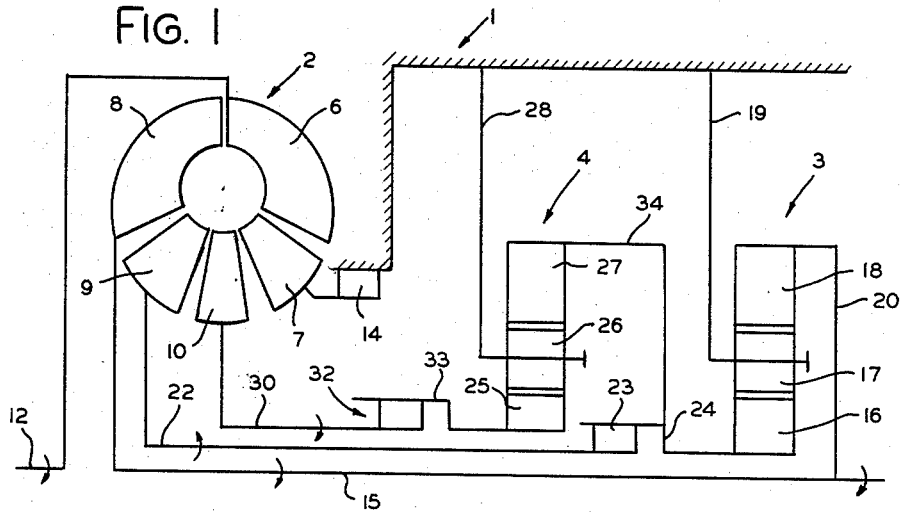

Sept. 3, 1963  N. A. SHEALY  3,102,435

TRANSMISSIONS

Filed Dec. 19, 1960

INVENTOR.
NOAH A. SHEALY
BY
ATTORNEYS

United States Patent Office 3,102,435
Patented Sept. 3, 1963

3,102,435
TRANSMISSIONS
Noah A. Shealy, Jackson, Mich., assignor to Clark Equipment Company, a corporation of Michigan
Filed Dec. 19, 1960, Ser. No. 76,899
8 Claims. (Cl. 74—718)

This invention relates to transmission and more particularly to transmissions embodying hydraulic torque converters and gear assemblies affording variable drive ratios for self-propelled vehicles.

It is known in the art to provide transmissions including torque converters having a plurality of turbine members associated with components of gear assemblies to provide multiple drive ratios between the prime mover and the output or propeller shaft of the vehicle. The known arrangements of the prior art are complex, requiring the utilization of many parts, and generally do not afford an adequate range of low speed ratios, especially for heavy duty equipment such as earth movers and other industrial types of self-propelled vehicles.

It is an object of my invention to provide new and unique transmissions embodying a torque converter having a plurality of turbine members, together with gear assembles affording high stall torque multiplication and in which the operating range especially at low speed ratios is substantially extended over known transmissions.

A further object of my invention is to provide transmissions as last noted in which simple one-way torque transmitting means may be incorporated between a gear assembly and turbine members of a torque converter and which automatically operate so as not to require manual manipulation of the transmission by the operator of the vehicle.

A further object of my invention is to provide transmissions as aforesaid in which the gear assemblies may comprise internal gear speed reduction units or spur gear sets.

In order to achieve the aforementioned objects I propose to provide a transmission having input and output shafts, a torque converter including conventional pump and reactor members, and a plurality of turbine members arranged with the input shaft connected to the pump member of the torque converter, and one of the plurality of turbine members connected directly with the output shaft. In such arrangement of components another of the plurality of turbine members is operatively connected through one-way torque transmitting means with a first gear assembly which has connection with the output shaft for applying the torque of such turbine member to the output shaft. In the preferred embodiments of my invention, I further propose to employ a torque converter having still another or third turbine member which has connection with a second gear assembly, and by means of second one-way torque transmitting means affords application of the torque of such third turbine member to the first gear assembly and thence to the output shaft. The aforementioned first and second gear assemblies may comprise known internal gear speed reduction units or simple spur gear sets as will be described in detail hereinafter. Further, the first and second one-way torque transmitting means may comprise conventional one-way clutches operative to transmit torque of the turbine members to the output shaft within the ranges of the outputs of such turbine members and associated gearing after which they conventionally simply overrun after cessation of torque multiplication therethrough.

The above and other objects and advantages of my invention will be clear from the following detailed description of certain preferred embodiments of my invention.

Now in order to acquaint those skilled in the art of the manner of constructing and utilizing transmissions in accordance with the principles of my invention, I shall describe in connection with the accompanying drawings certain preferred embodiments of my invention.

Figure 2:
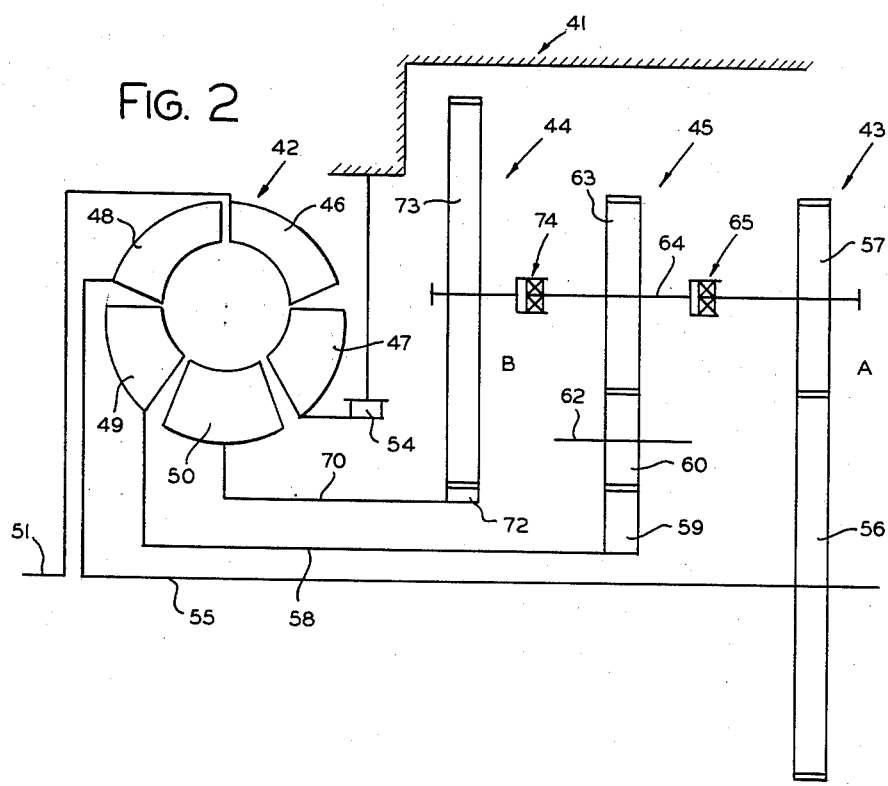

In the drawings:

FIGURE 1 is a diagrammatic view of a transmission constructed in accordance with the principles of my invention embodying a torque converter having a plurality of turbine members, and a pair of internal gear speed reduction units; and FIGURE 2 is a diagrammatic view of another embodiment of my invention employing a torque converter having a plurality of turbine members and an arrangement of spur gear assemblies.

For purposes of simplification I have shown preferred forms of transmissions of my invention diagrammatically in that the several components per se are old and well known and those skilled in the art may readily construct and assemble transmissions embodying such old components in the novel combination of parts of my present invention in accordance with expedients long old and common in the art.

Referring now to FIGURE 1 of the drawings, the transmission there shown comprises in its general organization of parts a transmission housing 1 which encloses a hydraulic torque converter 2, a first gear set 3 and a second gear set 4.

The torque converter 2 comprises conventional pump and reactor members 6 and 7, respectively, and a plurality of turbine members 8, 9 and 10.

An input shaft for the transmission, indicated at 12, has connection in a conventional manner with the pump member 6 of torque converter 2. For purposes of the present disclosure, it is assumed that the input shaft 12 rotates in a clockwise direction when viewing the transmission from the left hand side of the drawing so that in this sense the pump member 6 is caused to rotate clockwise by the prime mover for the vehicle in which the transmission is installed. As is known, the reactor member 7 upon rotation of the pump member 6 tends to rotate in an opposite direction, but also, as is known, suitable one-way torque transmitting means, such as a one-way brake 14, is arranged between the reactor member and a stationary or fixed component of the transmission housing 1 to prevent such rotation and impel the fluid within the converter against turbine member 8 to rotate it in the same direction as pump member 6. The turbine member 8, as shown, has direct connection with output shaft 15 for the transmission and this output shaft has suitable connection (not shown) to the wheels of a vehicle or other member to be driven by the transmission.

The first gear set 3 comprises a first central spur gear or input gear 16, a plurality of first pinions, one of which is shown at 17, which are mounted on fixed axes and positioned at the periphery of the first spur gear in engagement therewith, and a first ring gear or output gear 18 surrounding the spur gear 16 and pinions 17 and having internal teeth in engagement with the pinions. The gear set 3 is thus similar in structure to a reversing planetary gear set, except that the pinions 17 are mounted on a carrier 19 which is made fast to the transmission housing to hold the carrier against rotation, and thus the gear set 3 is not capable of planetation. It will be observed that the first ring or output gear 18 has connection by suitable conventional connecting means, indicated at 20, to the output shaft 15. Upon reference again to the torque converter 2, it will be observed that the turbine member 9 is caused to be rotated in a counter-clockwise direction, i.e., in a direction opposite to the direction of rotation of turbine member 8 and it has connection by suitable known means, diagrammatically indicated at 22, to one-way torque transmitting means 23, which, in turn, through suitable connecting means, indicated at 24, extends to the first sun or input gear 16 of gear set 3. The one-way torque transmitting means 23 may comprise a simple overrunning or one-way clutch, and is operative during torque multiplication by turbine member 9 to apply torque to the first input gear 16 of gear set 3. The torque transmitted by turbine member 9 to the first gear set 3 is applied to effect clockwise rotation of output shaft 15.

The gear set 4 comprises a second central spur gear or input gear 25, second pinions, one of which is shown at 26, mounted on fixed axes and positioned at the periphery of the second spur gear in engagement therewith, and a second ring gear or output gear 27 surrounding the second spur gear and the second pinions and having internal teeth in engagement with the second pinions. The pinions 26 are mounted on a carrier 28 which is made fast to the transmission housing 1 or a component thereof so as to prevent rotation of the carrier and thus provide a second gear set substantially identical to the gear set 3. The torque converter 2 has its third turbine member, indicated at 10, connected by suitable known means, indicated generally at 30, to a second one-way torque transmitting means 32 from which suitable known connecting means 33 extends to the second input gear 25 of the second gear set 4. The turbine member 10 rotates in the same direction as turbine member 8, or clockwise in the previously mentioned assumed direction of rotation of the parts, and in such direction of rotation imparts through the one-way torque transmitting means 32 torque from member 10 to the second input gear 25 of gear set 4. Torque thus applied to gear 25 is applied through ring gear 27 through connecting means 34 to the previously referred to connecting means 24 and thus to the first gear set 3 and through the parts and components previously described to output shaft 15. The second one-way torque transmitting means 32 may, like the first torque transmitting means 23 comprise a simple one-way or overrunning clutch.

A satisfactory form of transmission constructed as aforesaid may be achieved by embodying gear sets 3 and 4 to afford 2:1 drive ratios therethrough. With such assumed ratios for the two gear sets, it will be seen that at stall the turbine member 8 is connected directly to the output shaft 15 and it will exert two engine torques on turbine member 8 and output shaft 15. Turbine member 9, which as previously mentioned, is driven in a direction opposite to the direction of rotation of the engine and turbine 8 will apply two engine torques on input gear 16 of the first gear set 3 through one-way torque transmitting means 23 which is multiplied by the aforementioned gear ratio of gear set 3 so as to apply four engine torques to the driven shaft and to rotate the latter in a clockwise direction. Turbine member 10 is rotated in the same direction as the engine and turbine member 8 and the fluid of the torque converter applies torque thereto equivalent to two engine torques. As previously noted, the turbine member 10 through the one-way torque transmitting means 32 applies its torque through the second gear set 4 and first gear set 3 in the same direction as turbine member 8. Thus the two engine torques, at stall, applied to turbine 10 and the multiplication of such torque by the assumed 2:1 ratios of the two gear sets 4 and 3 effects the application of eight times engine torque to output shaft 15. The overall torque multiplication at stall is equal to the sum of the several torques applied by turbine members 8, 9 and 10 with the latter two multiplied by the ratios of the gear sets 3 and 4 so as to provide a 14:1 stall torque multiplication. In a transmission constructed as aforedescribed and by actual calculation a 12:1 stall torque multiplication was obtained. By reason of the high stall torque ratio the transmission operates satisfactorily at low speed ratios and extends the operating range thereof to provide a transmission of a high degree of efficiency over the full range from stall to the point of driving of the driven shaft 15 by the turbine member 8. When the output shaft 15 reaches high output speeds and the turbines 9 and 10 are no longer effective for torque multiplication, the latter turbines simply float due to the first and second one-way torque transmitting means 23 and 32.

Referring now to FIGURE 2 of the drawings, the transmission there shown comprises a transmission housing diagrammatically illustrated at 41 which encloses a torque converter 42, a first simple gear set 43, a second simple gear set 44 and an idler gear set 45 intermediate the gear sets 43 and 44. The torque converter 42, as in the first described embodiment of my invention comprises a pump member 46, a reactor member 47 and a plurality of turbine members 48, 49 and 50, respectively. Suitable one-way torque transmitting means 54, such as a one-way overrunning brake, is arranged between reaction member 47 and the transmission housing or stationary part thereof so that the pump member 46 is effective through the fluid within the torque converter of applying engine torque to the several turbine members 48, 49 and 50 in known manner. The turbine member 48 has connection by any suitable means to the transmission output shaft 55, so that engine torque applied to turbine member 48 by means of input shaft 51 through the torque converter is applied directly to the output shaft 55. The simple gear set 43, as shown, comprises an output gear 56 keyed or otherwise suitably connected to the output shaft for rotating the latter and meshes with an input gear 57. The gears 56 and 57 may be simple spur gears.

The turbine member 49 like turbine member 9 of the first embodiment of my invention rotates in a direction opposite the direction of rotation of the engine and input shaft and has connection by suitable means indicated diagrammatically at 58 to an input gear 59 of the intermediate idler gear set 45. Input gear 59 as shown has meshing engagement with an idler gear 60 suitably mounted for rotation on an idler shaft 62, and the idler gear set 45 is completed by an output gear 63 mounted on counter-shaft means indicated generally at 64. The counter-shaft means 64 between output gear 63 of the idler gear set 45 and the input gear 57 of the first gear set 43 has one-way torque transmitting means 65 incorporated therewith, such as a over-running or one-way clutch operative to transmit torque from output gear 63 to input gear 57 of the first gear set 43. The idler gear set 45 provides for the application of torque of turbine member 49 through the gear arrangements above described to the output shaft 55 in the same direction of rotation as the direction of the torque applied by turbine member 48.

The third turbine member 50 has connection by suitable means indicated at 70 to input gear 72 of the second gear set 44, and the gear 72 has meshing engagement with output gear 73 of the gear set. The counter-shaft means 64 between output gear 73 of the second gear set 44 and the output gear 63 of the idler gear set 45 has a second one-way torque transmitting means 74 associated therewith, such as an overrunning or one-way clutch, so that torque from turbine member 50 is applied in a direction to rotate the output shaft 55 in the aforementioned clockwise direction through the one-way torque transmitting means 74 and 65 to input gear 57, and thence to output gear 56 of the first gear set 43. The pair of gears of the gear set 44 as well as the several gears of the idler gear set 45 may comprise simple spur gears.

The mode of operation of the transmission of FIGURE 2, it is believed, will be clear from the aforementioned description and it will be observed that upon providing gear sets 43 and 44 with a 2:1 reduction that, at stall, the several turbines are effective to deliver engine torque at a 14:1 ratio to the output shaft 55. The turbine members 48 and 50 rotate in the same direction and through the components described apply torque to the output shaft 55 in the same direction of rotation as the input 51 or prime mover shaft. The turbine member 49 rotates in a direction opposite that of turbine members 48 and 50 but through the idler gear set 45 applies its torque to the output shaft 55 in a clockwise direction. The aforementioned one-way torque transmitting means 65 and 74 permit the turbine members 49 and 50 to float when they are no longer effective in torque multiplication as when the turbine member 48 only is driving the output shaft 55 at a substantially 1:1 ratio. The transmission last described is highly efficient and the same advantages of extended operating range especially at low speed ratios is provided as in the first above described transmission.

While I have shown and described what I consider to be certain preferred embodiments of my invention, it will be understood that various modifications and rearrangements may be made therein without departing from the spirit and scope of my invention.

I claim:

1. In a transmission having an input shaft, an output shaft, a torque converter comprising a pump member connected with said input shaft, a reactor member, and a plurality of turbine members, one of said plurality of turbine members being connected with said output shaft, a first gear set including a first input gear and a first output gear, said first output gear being connected with said output shaft, means including first one-way torque transmitting means connecting a second of said plurality of turbine members with said first input gear, a second gear set including a second input gear and a second output gear, and means including second one-way torque transmitting means connecting a third of said plurality of turbine members and said second output gear with said first input gear of said first gear set.

2. In a transmission having an input shaft, an output shaft, a torque converter comprising a pump member connected with said input shaft, a reactor member, and a plurality of turbine members, one of said plurality of turbine members being connected with said output shaft, a first gear set including a first input gear and a first output gear, said first output gear being connected with said output shaft, means including first one-way torque transmitting means connecting a second of said plurality of turbine members with said first input gear, a second gear set including a second input gear and a second output gear, and means including second one-way torque transmitting means connecting a third of said plurality of turbine members with said second input gear and said second output gear with said first input gear of said first gear set.

3. In a transmission having an input shaft, and an output shaft, a torque converter comprising lamp and reactor members, and a plurality of turbine members, a first gear set including a first input gear, and a first output gear connected with said output shaft, one of said plurality of turbine members being connected with said output shaft, an idler gear set comprising an input gear connected with a second of said plurality of turbine members, an output gear, and an intermediate idler gear between said input gear and said output gear of said idler gear set, and means including one-way torque transmitting means connecting output gear of said idler gear set with said first input gear of said first gear set.

4. In a transmission having an input shaft, counter shaft means, and an output shaft, a torque converter comprising pump and reactor members, and a plurality of turbine members, a first gear set including a first input gear connected with said counter shaft means, and a first output gear connected with said output shaft, one of said plurality of turbine members being connected with said output shaft, an idler gear set comprising an input gear connected with a second of said plurality of turbine members, an output gear mounted on said counter shaft means, and an intermediate idler gear between said input gear and said output gear of said idler gear set, and one-way torque transmitting means for said counter shaft means between said output gear of said idler gear set and said first input gear of said first gear set.

5. In a transmission having an input shaft, and an output shaft, a torque converter comprising pump and reactor members, and a plurality of turbine members, a first gear set including a first input gear, and a first output gear connected with said output shaft, one of said plurality of turbine members being connected with said output shaft, an idler gear set comprising an input gear connected with a second of said plurality of turbine members, an output gear and an intermediate idler gear between said input gear and said output gear of said idler gear set, means including first one-way torque transmitting means connecting said output gear of said idler gear set with said first input gear of said first gear set, a second gear set comprising a second input gear connected with a third of said plurality of turbine members, and a second output gear, and means including second one-way torque transmitting means connecting said second output gear of said second gear set with said output gear of said idler gear set.

6. In a transmission having an input shaft, counter shaft means, and an output shaft, a torque converter including pump and reactor members, and a plurality of turbine members, a first gear set including a first input gear connected with said counter shaft, and a first output gear connected with said output shaft, one of said plurality of turbine members being connected with said output shaft, an idler gear set comprising an input gear connected with a second of said plurality of turbine members, an output gear mounted on said counter shaft means, and an intermediate idler gear between said input gear and said output gear of said idler gear set, first one-way torque transmitting means for said counter shaft means between said output gear of said idler gear set and said first input gear of said first gear set, a second gear set comprising a second input gear connected with a third of said plurality of turbine members, and a second output gear connected with said counter shaft means, and second one-way torque transmitting means for said counter shaft means between said second output gear of said second gear set and said output gear of said idler gear set.

7. In a transmission having an input shaft, an output shaft, a torque converter comprising a pump member connected with said input shaft, a reactor member, and a plurality of turbine members, one of said plurality of turbine members being connected with said output shaft, a first gear set having three elements, namely, a first central spur gear, first pinion means mounted on a fixed axis and positioned at the periphery of said first spur gear in engagement therewith, and a first ring gear surrounding said first spur gear and said first pinion means and having internal teeth in engagement with said first pinion means, one of said first three elements of said first gear set having connection with said output shaft, first means including first one-way torque transmitting means connecting a second of said plurality of turbine members with a second one of said first three elements of said first gear set, a second gear set having three second elements, namely, a second central spur gear, second pinion means mounted on a fixed axis and positioned at the periphery of said second spur gear in engagement therewith, and a second ring gear surrounding said second spur gear and said second pinion means and having internal teeth in engagement with said second pinion means, one of said second elements of said second gear set having connection with said second one of said first three elements of said first gear set, and second means including second one-way torque transmitting means connecting a third of said plurality of turbine members with a second element of said second gear set.

8. In a transmission having an input shaft, an output shaft, a torque converter comprising a pump member connected with said input shaft, a reactor member, and a plurality of turbine members, one of said plurality of turbine members being driven in a first direction and connected with said output shaft, a first gear set having three elements, namely, a first central spur gear, first pinion means mounted on a fixed axis and positioned at the periphery of said first spur gear in engagement therewith, and a first ring gear surrounding said first spur gear nad said first pinion means and having internal teeth in engagement with said first pinion means, said first ring gear of said first gear set having connection with said output shaft, first means including one-way torque transmitting means connecting a second of said plurality of turbine members driven opposite to said first direction with said first spur gear of said first gear set, a second gear set having three second elements, namely, a second central spur gear, second pinion means mounted on a fixed axis and positioned at the periphery of said second spur gear in engagement therewith, and a second ring gear surrounding said second spur gear and said second pinion means and having internal teeth in engagement with said second pinion means, said second ring gear of said second gear set having connection with said first central spur gear of said first gear set, and second means including second one-way torque transmitting means connecting a third of said plurality of turbine members driven in said first direction with said second central spur gear of said second gear set.

References Cited in the file of this patent
UNITED STATES PATENTS

| | | |
|---|---|---|
| 2,297,259 | Speiser | Sept. 29, 1942 |
| 2,379,015 | Lysholm | June 26, 1945 |
| 2,383,980 | Lysholm | Sept. 4, 1945 |
| 2,658,346 | Seybold | Nov. 10, 1953 |
| 2,685,169 | Saives | Aug. 3, 1954 |
| 2,814,214 | Kelley | Nov. 26, 1957 |
| 2,850,918 | Pollard | Sept. 9, 1958 |
| 2,892,364 | Hamilton | June 30, 1959 |
| 2,969,694 | Harmon et al. | Jan. 31, 1961 |